United States Patent
Bradley et al.

(10) Patent No.: US 9,098,482 B2
(45) Date of Patent: *Aug. 4, 2015

(54) METHOD AND SYSTEM FOR CROSS-PLATFORM FORM CREATION AND DEPLOYMENT

(75) Inventors: George Wesley Bradley, Nepean (CA); Jean Louis Brousseau, Gatineau (CA); Kevin Matassa, Gloucester (CA); Ernest Herscheal James Foster, Kanata (CA); Andrew John Neilson, Ottawa (CA); Mark Christopher Leyden, Nepean (CA); Keith Rolland McLellan, Ottawa (CA); Mark Andrew Brooks, Greely (CA); Zbigniew Rachniowski, Ottawa (CA); Anthony Robert Rumsey, Ottawa (CA); Nasif Hussain Dawd, Dhahran (SA)

(73) Assignee: Adobe Systems Incorporated, San Jose, CA (US)

(*) Notice: Subject to any disclaimer, the term of this patent is extended or adjusted under 35 U.S.C. 154(b) by 2430 days.

This patent is subject to a terminal disclaimer.

(21) Appl. No.: 11/868,847

(22) Filed: Oct. 8, 2007

(65) Prior Publication Data

US 2008/0098291 A1     Apr. 24, 2008

Related U.S. Application Data

(63) Continuation of application No. 10/121,697, filed on Apr. 15, 2002, now Pat. No. 7,313,757.

(60) Provisional application No. 60/284,746, filed on Apr. 18, 2001, provisional application No. 60/335,791, filed on Dec. 5, 2001.

(30) Foreign Application Priority Data

Apr. 17, 2001    (CA) ..................................... 2344074

(51) Int. Cl.
    *G06F 17/00*     (2006.01)
    *G06F 17/24*     (2006.01)

(52) U.S. Cl.
    CPC ................... *G06F 17/243* (2013.01)

(58) Field of Classification Search
CPC ... G06F 17/243; G06F 17/24; G06F 17/2247; G06F 17/227; G06F 17/248; G06F 17/3089; G06F 8/71; G06F 17/218; G06F 17/2264; G06F 17/30867; G06F 17/30893; H04L 67/303; H04L 67/306; Y10S 707/959; Y10S 707/99931; Y10S 707/99933
See application file for complete search history.

(56) References Cited

U.S. PATENT DOCUMENTS

| | | | |
|---|---|---|---|
| 6,026,433 A | 2/2000 | D'Arlach et al. | |
| 6,083,276 A | 7/2000 | Davidson et al. | |

(Continued)

FOREIGN PATENT DOCUMENTS

| | | |
|---|---|---|
| CA | 2344074 | 10/2002 |
| CA | 2381832 | 10/2002 |

OTHER PUBLICATIONS

JetForm, ReachForm™ XML-based forms for everyone White Paper, May 2000, JetForm's e-Forms Solutions, pp. 1-16.*

(Continued)

*Primary Examiner* — Nathan Hillery
(74) *Attorney, Agent, or Firm* — Finch & Maloney PLLC (57) ABSTRACT

The present invention is directed to systems and methods of creating and deploying electronic forms for collecting information from a user using a browser, where the browser may be one of a plurality of browser platforms. Characteristics of forms are entered by a human designer using a form designer by using drag-and-drop operations, and stored in XML template files. The form may be previewed by the designer. When a user on the Internet (or an intranet) requests a form by a browser, the characteristics of the browser are sensed and a form appropriate for the browser is deployed to the browser by a form server. Information is then captured from the user. The form may also be saved or printed.

23 Claims, 2 Drawing Sheets

(56) References Cited

U.S. PATENT DOCUMENTS

| | | |
|---|---|---|
| 6,301,584 B1 | 10/2001 | Ranger |
| 6,336,137 B1 | 1/2002 | Lee et al. |
| 6,345,278 B1 | 2/2002 | Hitchcock et al. |
| 6,490,601 B1 | 12/2002 | Markus et al. |
| 6,569,207 B1 | 5/2003 | Sundaresan |
| 6,581,072 B1 | 6/2003 | Mathur et al. |
| 6,589,290 B1 | 7/2003 | Maxwell et al. |
| 6,675,353 B1 | 1/2004 | Friedman |
| 6,704,906 B1 | 3/2004 | Yankovich et al. |
| 6,715,129 B1 | 3/2004 | Hind et al. |
| 6,725,231 B2 | 4/2004 | Hu et al. |
| 6,725,426 B1 | 4/2004 | Pavlov |
| 6,732,175 B1 | 5/2004 | Abjanic |
| 6,732,331 B1 | 5/2004 | Alexander |
| 6,741,853 B1 | 5/2004 | Jiang et al. |
| 6,744,447 B2 | 6/2004 | Estrada et al. |
| 6,748,425 B1 | 6/2004 | Duffy et al. |
| 6,791,582 B2 | 9/2004 | Linsey et al. |
| 6,799,299 B1 | 9/2004 | Li et al. |
| 6,829,630 B1 | 12/2004 | Pajak et al. |
| 6,832,351 B1 | 12/2004 | Batres |
| 6,850,979 B1 | 2/2005 | Saulpaugh et al. |
| 6,854,120 B1 | 2/2005 | Lo et al. |
| 6,910,068 B2 | 6/2005 | Zintel et al. |

OTHER PUBLICATIONS

JetForm® Announces First Comprehensive XML Forms Definition to Speed E-Commerce Adoption, Jun. 28, 1999, Ottawa, pp. 1-3.*

Richard Devitt, et al. "XFA-Template Version 1.0" (May 1995) [online] http://www.w3.org/1999/05/XFA/xfa-template.

Canadian Intellectual Property Office Non-Final Office Action in Canadian App. No. 2,381,832, mailed Apr. 2, 2009, 4 pages.

JetForm Corporation, "JetForm® Announces First Comprehensive XML Forms Definition to Speed E-Commerce Adoption", http://www.oasis-open.org/cover/jetform-prior990628.html, Jun. 28, 1999, retrieved on Sep. 24, 2005, 4 pages.

XFA Technology, "JetForm XML Forms Architecture xfa.com" http://web.archiv.org/web/19991122040724/http://www.xfa.com/technology.html, Nov. 22, 1999 retrieved on Sep. 24, 2005, 11 pages.

Butler Direct, Ltd. "Technology Audit—E Process Framework", http://web.archive.org/web/20000817222207/www.jetform.com/e-process/butler.htm, Feb. 2000, retrieved on Sep. 24, 2005, 14 pages.

"Introduction to the ASP+ Page Framework, Part 1" presented at the Microsoft Professional Developers Conference in Orlando, Florida, on Jul. 11-14, 2000; 11 pages.

"Introduction to the ASP+ Page Framework, Part 2" presented at the Microsoft Professional Developers Conference in Orlando, Florida, on Jul. 11-14, 2000; 8 pages.

Pardi, William J.; "XML in Action Web Technology—Chapter 8, XSL: XML with Style", pp. 162-192, 1999, Microsoft Press, 34 pages.

USPTO Non Final Office Action in U.S. Appl. No. 10/121,697, mailed Jun. 27, 2006, 24 pages.

USPTO Final Office Action in U.S. Appl. No. 10/121,697, mailed Dec. 14, 2005, 16 pages.

USPTO Non Final Office Action in U.S. Appl. No. 10/121,697, mailed Jun. 29, 2005, 17 pages.

USPTO Final Office Action in U.S. Appl. No. 10/121,697, mailed Jan. 9, 2007, 26 pages.

Canadian Intellectual Property Office Non-Final Office Action in Canadian App. No. 2,344,074, mailed Jul. 14, 2009, 14 pages.

Mckenzie, Gavin; XFA-Template; Jun. 14, 1999; W3C; version 1.0, 11 pages.

* cited by examiner

METHOD AND SYSTEM FOR CROSS-PLATFORM FORM CREATION AND DEPLOYMENT

RELATED APPLICATIONS

This application is a continuation (and claims the benefit of priority under 35 USC §120) of U.S. application Ser. No. 10/121,697, filed Apr. 15, 2002, and the benefit of priority under 35 USC §119(e) from U.S. provisional application Ser. No. 60/284,746, filed Apr. 18, 2001, U.S. provisional application Ser. No. 60/335,791, filed Dec. 5, 2001, and Canadian Patent Application No. 2,344,074, filed Apr. 17, 2001, the disclosure of all of which is hereby incorporated by reference.

FIELD OF THE INVENTION

The present invention is directed to systems and methods of electronic forms. More specifically, it assists in the creation and deployment of electronic forms for collecting information using a browser, where the browser may be one of a plurality of browser platforms.

BACKGROUND OF THE INVENTION

Organizations are looking to the Internet to help them cut costs and improve service, two typically opposing objectives. In this document, the term Internet is used generically to refer to any network which supports http protocol for browsing, such as an intranet or extranet. By electronically connecting departments and offering customers convenient online access to electronic forms, organizations can, however, cut overhead and deliver the service improvements that their constituents and clients desire.

In this document leveraging the Internet in this way is referred to as e-business, a revolution driven by both customer expectation and government legislation. In fact, the U.S. federal government has mandated that, by 2003, all agencies offer their forms electronically as well as in paper. Known as the Government Paperwork Elimination Act (GPEA), this legislation responds to the public's demands for more efficient and cost-conscious government.

The Internet allows businesses that are using the Web as a tool to reap its rewards. There is little reason to make a user stand in line for 45 minutes to complete a transaction that the person could perform in two minutes online. Service-oriented firms are capitalizing on the Web to cater to time-pressed customers, serving them when and where they want—at home, at a grocery store kiosk, in the office or even on their mobile devices. Companies are building customer loyalty as the leading e-businesses raise the bar against their competition offering improved access and service.

The Internet is also generating an explosion in B2B (business-to-business) transactions. Forrester Research Inc. predicts that by 2004, U.S. B2B activity will be worth $2.7 trillion, growth fueled by tremendous expansion in the e-marketplace and e-processes. Companies that learn to operate efficiently in this new digital economy will gain a substantial edge.

This invention, by making it easy for people to access and submit forms online using the Internet, solves the issue of reaching all customers and citizens via their Web browsers—on a large variety of platforms and devices—without requiring them to download any proprietary software or plug-ins.

Organizations have typically dealt with this incompatibility in one of three ways, each of which has pronounced drawbacks.

A common approach is to create a single HTML form that operates with early versions of different browsers. Two problems exist with this "lowest common denominator" solution. First, anyone with an even earlier browser version will not be able to read the form. For example, if an organization creates an HTML form that can be read by, say, version 2.0 of different browsers, people running version 1.0 will not be able to access the form. Governments and businesses want to avoid this type of technological discrimination.

The second shortcoming of this single HTML form solution is that people will not be able to take advantage of the increased intelligence and capabilities of advanced browser versions. Consider this hypothetical example: someone applies to renew a driver's license online six months after her license expired. But, because the license has expired, she needs to submit additional information with her renewal. An advanced browser would potentially allow the license-issuing organization to automatically present the applicant with another online form required to capture the extra data. A basic HTML form may not have the intelligence to accommodate this type of interactivity, thereby causing delays in renewing the license and effectively discriminating against those without the new browser.

A second solution—and an awkward one at that—is to design and maintain separate versions of HTML forms to ensure that the Web form appears properly regardless of the user's platform or browser. But this approach involves keeping three or four different versions of the same electronic form current, a costly, risky and inconvenient restriction. Should a form change, a Web programmer has to re-design all underlying versions and make sure that the change appears uniformly in each one. The more balls in the air, however, the more likely that one will drop, and citizens or customers could easily wind up with two substantially different versions of what should be the same form.

In such a situation, two customers may well pay two different prices for the same merchandise or two hunting license applicants might pay different fees. Making the change once and knowing that it will appear properly regardless of the users' computer types or browsers would be much simpler, less costly and potentially less discriminatory.

The third traditional solution requires that citizens and customers first download a proprietary plug-in onto their computers. Once they complete this step, they can download and read forms that require this proprietary plug-in.

The problem with this approach, aside from having to find and wait for the plug-in to download and install, is that citizens and customers must also download the forms, a process that can burden them with lengthy waits. People do not appreciate waiting several minutes—or longer—for forms to finally appear.

The present invention overcomes the drawbacks of these traditional solutions. Not only does it avoid the pitfalls of conventional approaches, it introduces a host of value-added conveniences that make designing and distributing e-forms on the Web easier.

SUMMARY OF THE INVENTION

The present invention is directed to a method for assisting a designer to create a form definition template for collecting information from a user on a browser platform using an electronic form, by receiving from the designer the characteristics of the electronic form, storing the characteristics of the electronic form in the form definition template, the form definition template being in Extensible Markup Language (XML) and the form definition template adapted to be deployable on any one of a plurality of browser platforms.

In accordance with another particular aspect of this invention, this invention is directed to a method for collecting information from a user on a browser platform using an electronic form, the characteristics of the electronic form being stored in a form definition template, including sensing the characteristics of the browser platform, retrieving the form definition template, the form definition template comprising an electronic document in Extensible Markup Language (XML), and the form definition template adapted to be deployable on a plurality of browser platforms, generating the electronic form in a format suitable for presentation on the browser platform from the form definition template; and capturing information input from the user.

In accordance with one particular aspect of this invention, this invention is directed to a system for collecting information from a user using an electronic form, a browser platform for capturing information from the user; a web server in communication with the browser platform, for sensing the characteristics of the browser platform; a computer storage for storing the characteristics of the electronic form stored in a form definition template, and a Server in communication with the web server, for retrieving the form definition template from the computer storage, and for generating the electronic form in a format suitable for presentation on the browser platform from the form definition template, wherein the form definition template comprises an electronic document in Extensible Markup Language (XML), and the form definition template is adapted to be deployable on a plurality of browser platforms.

In accordance with a further particular aspect of this invention, this invention is directed to system for collecting information from a user using an electronic form. The system includes a browser platform for capturing information from the user, a web server for sensing the characteristics of the browser platform, a computer storage for storing the characteristics of the electronic form stored in a form definition template, and a Server for retrieving the form definition template from the computer storage and for generating the electronic form in a format suitable for presentation on the browser platform from the form definition template, where the form definition template includes an electronic document in Extensible Markup Language (XML) and the form definition template is adapted to be deployable on a plurality of browser platforms.

In a further variation, this invention concerns a method for remote collection of information from a user on a browser platform using an electronic form, comprising sensing the characteristics of the browser platform; retrieving the characteristics of the electronic form stored in a form definition template; building a form package for (1) presenting the electronic form to the user using the browser platform at a remote system, and (2) saving form information collected from the user onto storage at the remote system; and delivering the form package to a system accessible to the user.

This invention is also directed to a method for remotely collecting information from a user on a browser platform using an electronic form, comprising receiving a form package from a Server; and generating browser code from the form package for presenting the electronic form to the user using the browser platform and saving form information collected from the user onto storage; saving the browser code; collecting the information from the user using the browser code; and transmitting the information to the Server.

This invention is further directed to a method for remotely collecting information from a user on a browser platform of a remote system using an electronic form, the electronic form having at least one page, comprising the steps of sensing the characteristics of the browser platform being browser platform characteristics; retrieving the characteristics of the electronic form being electronic form characteristics stored in a form definition template at a computer storage; delivering a form package from a form server electronically connected to the computer storage to the remote system for capturing the information using the electronic form including data, if any data, in a format suitable for presentation on the browser platform using the browser platform characteristics; generating browser code at the remote system from the form package; saving the browser code at the remote system; and capturing the information from the user on the browser platform using the electronic form including data, if any data.

In accordance with a further aspect, this invention concerns a system for remotely collecting information from a user on a browser platform of a remote system using an electronic form, the electronic form having at least one page, comprising: a web server in communication with the browser platform, the characteristics of the browser platform being browser platform characteristics; a computer storage for storing the characteristics of the electronic form being electronic form characteristics in a form definition template; and a form server in communication with the web server and the computer storage for:
  retrieving the form definition template from the computer storage,
  producing a form package using browser platform characteristics for capturing the information at the remote system using the electronic form in a format suitable for presentation on the browser platform, including data, if any data; and
  transmitting the form package to the remote system;
wherein the remote system performs the functions of:
  receiving the form package from the form server;
  generating browser code from the form package;
  saving the browser code at the remote system; and
  capturing the information from the user on the browser platform using the electronic form.

These and other features, and advantages of the present invention will become more apparent in view of the following detailed description.

DETAILED DESCRIPTION OF THE PREFERRED EMBODIMENTS

The present invention will now be described according to preferred embodiments of the present invention and in connection with the accompanying Figures.

1. Overview

Figure 1:
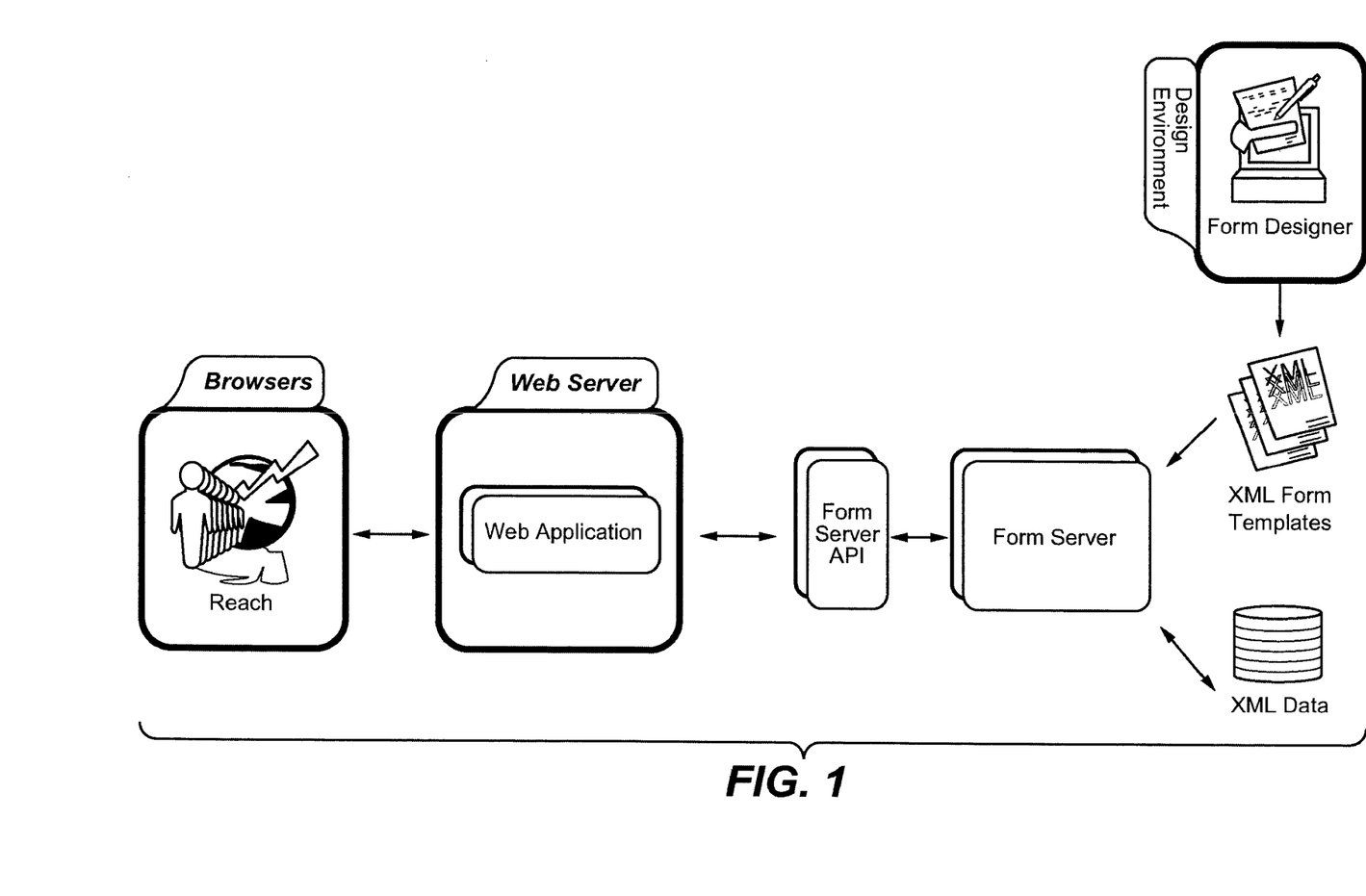
FIG. 1 illustrates an overall block diagram of the system according to a preferred embodiment of the present invention.

A preferred embodiment of the present invention is shown in FIG. 1. This embodiment incorporates the two main components of the invention: the Designer and the Server. The Designer allows a designer to design e-forms and to preview forms while designing; and the Server enables the access of completed forms using a Web server for public access. The Server may reside at the same computer system as the Web server or a separate and independent system.

A point and click application used to create intelligent XML templates, the Designer provides a simple way to create and maintain e-forms without involving third-party tools. It creates templates (typically XML Forms Architecture ("XFA")) or structured XML user-interface "form" definitions that render the data and the presentation specified by the template in a format suitable for the user's run-time environment.

Employing the Designer's WYSIWYG graphical design tools for user interfaces, designers can quickly include list boxes, drop down lists, command buttons, radio buttons, check boxes, lines, circles, images and static text—anything they need to create a form. The Designer can also be used to incorporate database lookups, calculations, automatic formatting, choice lists and even automatic error checking to prevent respondents from entering incorrect data and delaying the processing of their e-forms.

The second component, the Server, is a server that takes a single form template created with the Designer and delivers it in any of a number of browsers. Automatically detecting the browser environment (browser platform characteristics), the Server does a transformation and delivers the user-interface form in the appropriate browser language. In this document, the term "Server" is used to refer to this type of server, referring to the computer code effecting the functionality. Communication with the Server may refer to a number of means, whether entirely in the same physical system or by telecommunication means, or a combination of such means.

The Server also allows, in a variation, a user to enter data into a form while disconnected from the Internet, i.e. offline. The form may be single-paged or multi-paged. A package, containing form information, is prepared by the Server when invoked, typically by a programming interface; the package is downloaded to a separate system of the user; the user would then be able to use his or her browser to access the content of the package and fill in the form while disconnected from the Internet. Subsequently, the user has the option of going online to submit a completed form or submit a partially submitted form for validation.

This latter aspect may be implemented as a standalone system or software; alternatively it may be a subcomponent of the Server. In other words, the Server would be able to both perform (1) packaging of the form template and then transmit the package to the local user system, and (2) transform the form template and then deliver the browser language file for display/rendering on the user system. It may also only provide functionality to prepare a package of the form template and then possibly transmit the package to the local user system, without the more typical feature of receiving form input from an online user.

1.1 The Form Previewer

The form previewer functionality of the Designer enables designers to see in real time how their forms will appear in different browsers. Designers simply select the desired preview format and the form appears immediately as it would in the selected browser (wysiwig).

This convenient feature allows designers to customize forms as they create these to produce the desired appearance. Simplifying the design process, the form previewer allows people to generate forms faster and make changes quicker, boosting their productivity and their effectiveness.

1.2 The Server

The second primary component of the invention, the Server, takes a template (form definition template) created with the Designer and delivers it in any of a number of browsers. Templates are designed once and then deployed to any number of users, allowing organizations to manage their e-process and e-business initiatives without creating and maintaining a user interface to accommodate each browser type.

Automatically detecting the browser environment, the Server delivers the user-interface form in the appropriate language, for instance, DHTML, HTML or Java. (In this document, the term "browser code" is used to refer to the textual specification of the form, which could be in any browser-based language or a mixture of which, e.g. HTML and Java.) Identifying the particular hardware (e.g. PC, PDA, Wireless device) or operating system (Windows, Mac OS, or Linux) is not important provided the correct browser environment is detected. The Server extracts the field information, such as the type and the positioning, and the boilerplate information, such as the lines and the static text, from the template and converts it to a format that best suits the target browser on the client desktop.

The Server also provides intelligent templates for user interfaces. An enterprise can validate a users data entry before processing by performing calculations, accessing databases or enforcing business rules on field-level data. Whenever data is submitted to the server, the Server merges the data it has received into the template and executes the business logic contained in the template. The resulting data is then returned to the browser.

Given that the business logic—the validity checks and calculations—occur at the server, even HTML forms can have intelligence without requiring Web-application programming. However, provided that the user's browser has sufficient functionality, business logic may be delivered with the form.

To allow end-users to print and save forms locally, the Server can convert the template (typically XFA), with or without the merged data, to another format suitable for printing, such as PDF. Unlike with ordinary HTML forms that print using the Web browser, enterprises can precisely control the layout and pagination of these forms. Users can therefore print their filled-out forms—license applications, customer statements, invoices, order confirmations, contracts, insurance policies, change of address forms and the like—for their records. They can also sign them and mail them to comply with laws, regulations or policies, where required.

The Server is, typically but not exclusively, stateless, and is therefore typically accessible via an Application Programming Interface ("API"). This means that the Server becomes active typically when it is requested (via the API) to perform a function.

XML (eXtensible Markup Language) is used by the present invention for its versatility. A system for defining, validating and sharing document formats, XML has emerged as the basis for B2B communications on the Internet, and it will underpin an enterprise's processes as well. However, this invention is not necessarily limited to the use of XML as a specification as is clear to a person skilled in the art.

XML Forms Architecture ("XFA") is an open, public specification that defines how a form will appear and act in an XML environment. See http://www.w3.org/1999/05/XFA/xfa-template.html for details of XFA. This open architecture ensures that form solutions will expand with the needs of the enterprise and integrate easily with products from other vendors.

Separating its data elements from the details of its graphic presentation, XFA assumes no proprietary data schema, which means that an enterprise can use the system for a broad range of e-process operations. Because XFA works with a large number of browsers or computer platforms, an enterprise can confidently treat all users in the electronic domain the same.

1.3 Offline Form Completion

In a preferred embodiment of this invention, end users access the Server, by a browser or otherwise, to retrieve an offline form package containing a form, typically generated earlier using the Designer. The form may be single or multi-paged, and may also be a form generated using the Designer discussed above, though not restricted to such. The Server transforms the form into an offline package. The offline package contains all the pages in the form in the appropriate language supported by the browser, any associated images and the supporting client-side script. The Server determines the platform and browser prior to creating the package and will send the package associated to their platform/browser. Typically the end user saves this package to his or her local system and can disconnect from the Internet without affecting completion of the form. The package may be saved to any system accessible to the user.

The end user can then open the offline package, typically using a web browser, to access the form. The end user can subsequently fill in the form and save the data locally (or anywhere accessible to the user) while offline (disconnected from the Internet). In addition, the user can open previously saved form data to complete a form before submitting it, typically back to the Server.

In a variation, the user may submit a partially complete form to a Server and then complete the form online, that is to say connected to the Internet and not saved in a system separate from the Server.

1.4 Application Programming Interface

The Application Programming Interface is the method used by applications to communicate with, and access the services of, the Server. The API is used to interface with the Server and integrate the Server functionality into Web applications. As mentioned earlier, the Server is typically stateless, and is therefore typically accessible via the API. This means that the Server typically becomes active when it is requested (via the API) to perform a function.

Offline form completion is another transformation type for the Server, and has its own API's.

1.5 Web Application

The Web application provides the end user with access to Web facilities. This can be done using HTML pages, Application Server Pages ("ASP"s), ColdFusion™ pages and others. Using the API, the Web application gathers information from the end users browser. From a single template, the Server determines the browser type and then transforms the form template, with or without data, into a format that best suits that particular browser type.

1.6 Browser Interface

Forms created can be accessed via the Internet (or an intranet) from a wide range of Web browsers using a wide range of devices (desktop, handheld or mobile).

2. Designing a Form Using the Designer

In one preferred embodiment of the invention, the Designer window displays one or more of standard user interface features such as a title bar, a menu bar, an array of toolbars, and a status bar. See FIG. 2. The window also provides features—an Object Toolbox, special toolbars, and a Property Browser.

Figure 2:
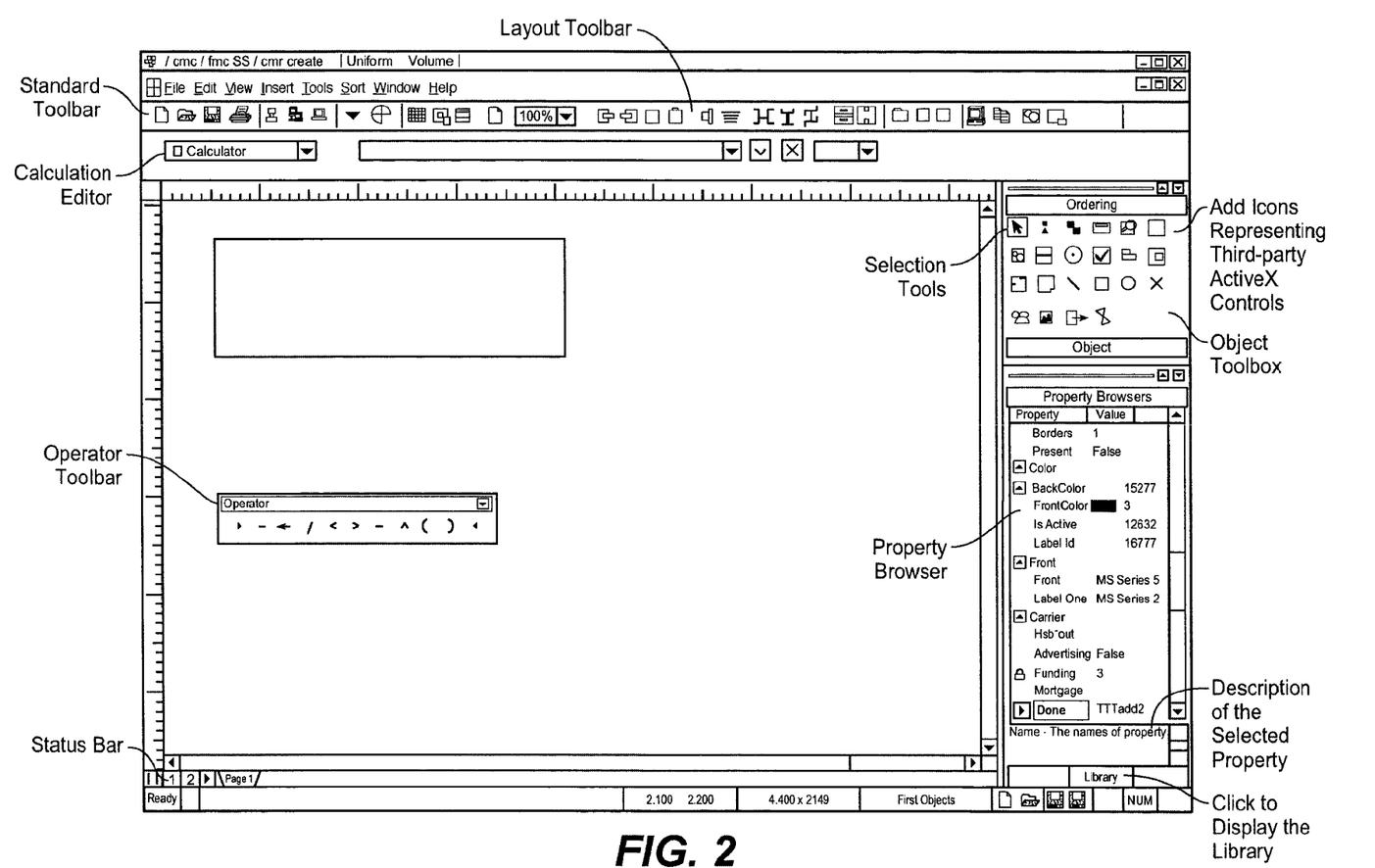
FIG. 2 shows a Designer window according to another embodiment of the present invention.

The Object Toolbox provides a quick way to add objects to the form. It contains two sets of tools: the drawing objects and the utility objects. Click on the tabs to view one or the other. By default and typically, the toolbox is docked on the right when Designer is first opened. Hide or display the Toolbox by clicking its toggle tool on the standard toolbar.

Designer typically includes two specialized toolbars. The Standard toolbar contains several tools that are probably familiar to a typical user of Windows software plus a few tools that are specific to the application. The Layout toolbar provides convenient access to alignment and sizing tools and to grouping functions. Position the pointer over the tool to view its ToolTip.

The status bar is located at the bottom of the window. The contents of the status bar change depending on whether the mouse pointer is positioned over a menu item, a toolbar button, or an object on the form.

One preferred embodiment of this invention allows the specification of the size and orientation for each page of the form and to display the page outline in the form window. When a user starts a new form, there may not be paper size specified. To change the settings, click File> Page Setup on the menu. This invention displays the page sizes and orientations available from the designer's computers default printer. Once the user has selected a page size the designer may choose to view the page outline.

Form objects are the elements on the form that provide users with information and allow them to enter data. Designer contains two toolboxes that hold these objects. One toolbox contains drawing objects, and the other contains utility objects.

2.1 Drawing Objects

Drawing objects are the visible elements on a form. They include field-type, and text and graphical drawing objects.

The field-type drawing objects include:

- Fields provide the user with places to enter data or to display data that is generated by a calculation, script, or database connection.
- Mask Text Field objects allow the predefinition of the format of a field. For example, a user can standardize the appearance of a telephone number and ensure that the user can only enter numeric data.
- Radio buttons enable the user to select one of several options in a group. When radio buttons have the same value in the Group Name property, they are mutually exclusive; only one of the buttons can be selected at any time. For example, when selecting from a group of radio buttons whose group name is "Marital Status", the user can select only one of the options, such as "Married", "Divorced", "Single", or "Widowed."
- Check boxes provide the user with a convenient way of selecting one or more options.
- Drop-down list boxes and list boxes provide a list from which the user can make a selection. The list can be populated at design time or can be linked to a database.

Bar codes appear as a graphic until the user clicks on it or tabs to it, at which point it appears as a field. The user can type a new bar code value in the field. When the field is not active, the bar code field reverts to a graphic.

- Command buttons provide a mechanism for the user to initiate Click events—actions such as printing or moving to the next or previous page. When the user clicks the command button, the Click event takes place. One must write the script to define the desired Click event.
- The HTTP Post object appears on the form as a command button that the user clicks to send XML data to a server. There is no need to script the Click event to initiate the transfer of data because that functionality is already built into the object. The HTTP post object also enables the form to receive data back from the server and either load it into a form or present the next HTML page in the desired sequence.

Text and graphical drawing objects include:
Text objects are used to create titles, to label fields or other form objects, or to add static text to a form.
Lines, rectangles, and circles or ellipses are graphical objects that enhance the visual appearance of the form.
Graphic objects enable one to place graphic images, such as a logo, on the form. Use a path and file name or a Universal Resource Locator (URL) to specify the graphic file to use, or embed the graphic in the form. One can place different types, including the following three, of graphics on a form:
.bmp—bitmap format
.jpg—Joint Photographic Experts Group (JPEG)
.tif—Tagged Image File Format (TIFF).
Date/Time objects provide end users with a formatted date or time field.
The Verbal Eyes object "reads" forms to visually impaired users who use screen reader applications.

2.2 Utility Objects

Utility objects provide a form with additional or enhanced functionality, which include the following:
The signature object on a form enables users to create digital signatures on their filled forms. The signature object provides an additional level of security and informs users if the form or its data has been modified by an unauthorized individual. The signature object interacts with a third-party component, such as Entrust and CryptoAPI [is this a third party system, or internal to the Server???] our internal system interacts with a third party system, that provides security services.
Use the script object to store scripts shared between form objects. The script level variables defined in the script object are retained between uses of the script. One can also call properties and methods between different Active Scripting languages.

2.3 Adding Objects to the Form

The typical steps for adding an object to a form include the following:
1. In the Drawing or Utility Object Toolbox, click on the required form object.
2. Move the mouse pointer onto the form. The pointer changes to crosshairs.
3. Position the crosshairs on the form where one wants to draw the object.
4. Press the left mouse button, and drag the mouse to draw the form object.
5. Release the mouse button when the object is the required size.
One can also click the object in the Toolbox and drag-and-drop it to the desired position on the form.

2.4 Third-Party ActiveX Controls

Third-party ActiveX controls are objects that interact in a standard way with COM-compatible software products. The Server, described later, does not transform third-party ActiveX™ controls into HTML for delivery to users. However, ActiveX controls and other COM-based components may be used to perform work as part of the script processing executed by the Server. For example, the Server can invoke the use of ADO objects or Custom Business objects on behalf of the script contained on the form.

2.5 Realization of Images

In one preferred embodiment of the present invention, the Designer creates image files (.JPG) for forms that contain the static elements such as text, lines, rectangles, circles, borders around some fields, and field labels. When the browser displays the form, the Server places the data entry elements of the fields with any data, on top of the image. The Server determines where to place the data entry elements based on the capabilities and the default settings of the target browser.

Not all users will use the same browser features and defaults as the person designing the form. For example, users may prefer larger fonts. Other users may turn off backgrounds color, and font overrides. Browsers differ in how they implement rendering of white space. Some browsers give users the ability to manage the use of colors, fonts, spacing, and other presentation attributes.

2.6 Print Version of the Form

For ease-of-use and efficiency, it may be preferable to design two versions of a form: one for the Web and one for printing. An online form is generally easier to use if it is divided into a series of panels or pages that each fit on-screen with little or no scrolling. One would likely also use color and buttons to enhance the visual appearance and functionality of the form. This design works well when viewed online but not when printed. A form for printing would typically fit on a letter size or A4 page and would not contain command buttons.

2.7 Scripting, Methods and Events

In addition to the properties described in a previous section, in preferred embodiments objects also have associated methods and events. Scripting allows one to access and use an object's methods and events and thereby enables one to add intelligence and power to the forms and to improve data integrity. Scripting an object's methods and events also enables one to automate data entry for a form, modify object properties, and display or hide objects from an end user.

Methods are actions that change the state of an object.
Scripts can invoke methods to perform calculations and validations or to cause an action based on a specific event. For example, one may use scripts to:
Calculate a sum of the values of fields and automatically enter that value in a "Total" field
Return a specific value to a field
Employ a method to modify an object's properties under specific circumstances
Go to another page of the form when the end user clicks a command button Events are responses to an external action, such as a mouse click or a keystroke. An event can be the triggering of a script or a calculation. For example, a purchase order could contain a check box called "Discount" that is scripted to deduct a preset discount from the total when the user clicks in the check box on the client-side. The act of clicking in the check box triggers the event—the calculating of the discount.

One can generally write scripts to any of a form object's events. An event will take place at run time when the user performs the specified action. Form objects and controls may have different events, but typically not all objects have events.

Some scripts can be executed in the browser in real time under certain circumstances. This is known as "client-side scripting". Scripts that the browser is unable to execute are managed by the Server. This is known as "server-side scripting".

With client-side scripting, the user's browser software executes the scripts on a form. With one preferred embodiment of this invention, three conditions must be met for this to occur in one preferred embodiment of this invention:
The user must use at least Microsoft Internet Explorer 5.x or Netscape Navigator 6.0, or Opera 5, or higher.
The client-side scripts must be written with JavaScript.
Scripts must be designated to run at the client.
With server-side scripting, the Server executes scripts and returns the result to the browser. The Server is called to execute a script typically when the user clicks a specially designated command button, such as a SUBMIT button, on a form.

2.8 Events and Methods Supported 2.8.1 Events

In a preferred embodiment, the Server supports several form, page, and form object events, which include the following.

Form Events
    OnFormReady, takes place typically once during the initial display of the form
    OnFormClosing, takes place when a SUBMIT button is clicked, after OnCalculate, and after successful validation of the form.

Page Events
    OnInitialize, takes place after all fields on the page have initialized
    OnCalculate, takes place after all fields on the page have been calculated
    OnValidate, takes place when NEXT, PREVIOUS, and SUBMIT buttons are clicked
    OnEnter, takes place just before the page is to be displayed after OnInitialize, loading of data, OnCalculate but before OnFormReady. It is typically used to populate drop-down lists that are on that page.
    OnExit, takes place when the user clicks the NEXT or PREVIOUS button.

Form Object Events
    Click for the command button
    Click for the graphic object (client-side only)
    OnInitialize, takes place the first time the form is displayed
    OnCalculate, takes place when all but the NEXT, PREVIOUS, and SUBMIT buttons are clicked
    OnValidate, takes place when the NEXT, PREVIOUS, and SUBMIT buttons are clicked.
    OnEnter, takes place when the cursor enters the form object.
    OnExit, takes place when the cursor exits the form object.

2.8.2 Methods

In a preferred embodiment, the Server supports the following methods for form objects and pages. These are known as "subform area container nodes" in the XFA specification. They allow server side scripts, such as VBScript and JScript, to work with multiple occurrence fields.

Typical Methods Supported on the Drop-Down and List Box Objects
    Additem("Item To Add", index)—used to add an item to a drop-down list and list box.
    Clear( )—used to clear the contents of a drop-down list or list box prior to initializing the list.

Typical Methods Supported on a Field Object
    Parent.Find("Name", Occurrence)
    Parent.Count("Name")
    Parent.Calculate( )
    Calculate( )

Parent is the property of the field object that returns the container or the page object.

Typical Methods in a Container or Page Object
    Find("Name", Occurrence)
    Count("Name")
    Calculate( )

For example, use Me.Find (with VBScript) and This.Find (with JScript) when the page or form wants to find a field it contains and Parent.Find when a field wants to find another field on the same page. One can also use PageName.Find, where PageName is equal to the name of the page.

The following scripting example in VBScript demonstrate the use of the Find method:

```
Click event of a button
'
' Loop through all occurrences of all fields named "AMOUNT"
' and set the value to 5.0.
'
' This case uses parent because it is running in the
' context of the button on the page
dim count
dim i
count = parent.count("AMOUNT")
for i = 1 to count
    dim oField
    set oField = parent.Find("AMOUNT", i )
    oField.Value = 5.0
next
```

The following is a scripting sample in JavaScript that demonstrates the use of the Find and Count methods. Specifically, it is an OnCalculate sample that calculates the sum of values in all fields named TRANSPORT:

```
var nCount = Parent.Count("TRANSPORT");
var sum = 0.0;
var i;
for (i = 1; i <= nCount; i++)
    sum += Parent.Find("TRANSPORT", i).Value
this.Value = sum
```

2.9 XML Data Specifications

Preferred embodiments of this invention produce and read form data in an XML format. This enables organizations to exchange data between form and non-form applications using standard XML processing tools. As mentioned earlier, this invention is not limited to XML, but the following serves as a description of how the invention could be implemented using XML.

2.9.1 Forms, Templates, and Data

The following sets out the relationship between the XML form template file (.xft) and the XML form data file (.xfd).

Forms

A form is the combination of at least the form template and the form data presented to or entered by the user in one document. The Form Control object renders a form by reading the form template file (.xft) and then either provides the user with an empty data set or previously created one. The xft file is typically the form template created in Designer and the data set represents the resulting data stream after the form template has been filled.

Templates

The template is typically the form layout information created using Designer. The template generated by the designer is typically (but not exclusively) an XML-based document (typically XFA-XML Form Architecture) that contains all information such as form object placement, naming, display properties, validations, and calculations. The form template (also known as form definition template) is edited by a Designer and typically not changed by the user. The template contains all of the information necessary to display and manipulate the data displayed to the user.

Data

The form data represents typically the content entered by the user and data generated by calculations housed in the form template. The data can be saved in an XML document. By default in a preferred embodiment, user forms generate a XML document with an .xml extension.

The template typically contains all of the static information such as object names, drop down lists, calculations, number formatting, etc. while the data file contains the information entered by the user at runtime. The content saved in the data file is structured to respect page, group, and data record information.

2.9.2 Structure of XML Data Specifications

The structure of an XML file is similar to an HTML file. XML uses tags that identify and qualify the information that they surround. There are six distinct levels of tags within an XML data stream for a preferred embodiment of this invention:

- Header
- Resources
- Data records
- Template pages
- Object groups
- Objects

Header

The XML data stream header contains information about the XML data document, such as the version of XML and the encoding of the content. A header is typically included at the beginning of all XML data streams being read into a form template. Otherwise, the data stream will not be read and an empty form template will be presented to the user. Changes to the header information may affect how the XML data is read into the form template.

The Package Element

A package element typically wraps the form template and the data stream within the XML document. The package is the wrapper around the template name information and the data itself.

Resources

The XML data stream generally includes two distinct resource blocks: the form template file information and the data stream itself. Preferred embodiments of this invention use this information to associate the template with the data stream.

The next resource block is the data stream.

Data Records

The top level of data organization is the data record. Each completed form template is typically stored within the XML data stream as a data record. This allows the user to complete multiple instances of the template and store the information within an XML data file as a continuous stream separated as data records.

Object Groups

Form objects may be part of a named object group. These groupings must be identified within the XML data stream. Objects groups are delimited by start and end tags that surround the data for the objects that it contains.

Objects

Form templates contain fillable and non-fillable objects. Non-fillable objects are elements such as buttons, rectangles, and text. They are not used for data entry and do not appear in the XML data file. Fillable objects are elements such as text fields, drop-down list boxes, radio buttons, and check boxes. These objects are used for data entry and are typically mapped to the XML data file.

2.10 Data Access

Forms can access and interact with data repositories. Scripting is one typical way to add data access functionality to forms. The objects that one can use to have the form interact with external data sources may include:

- ActiveX Data Objects (ADO)
- Remote Data Service (RDS)
- Microsoft Transaction Server (MTS) Proxies
- Simple Object Access Protocol Remote Object Proxy Engine (SOAP ROPE)
- XML Data Islands (e.g., in an HTML page containing the form)

Which data access objects one chooses depends on the form and how one plans to deploy it. One should use the script object to access the database from the Server and populate the form fields with the appropriate values.

Forms deployed to Web browsers are subject to the browsers security restrictions, which may prevent objects from being created if they are not safe for scripting. One must consider the deployment environment and its security settings when choosing data access objects.

2.11 Third-Party ActiveX Controls

Third-party ActiveX controls enable the extension of the functionality of forms. These interact in a standard way that makes them available to COM-compatible products such as embodiments of the present invention. Examples of standard third-party ActiveX controls are the Microsoft Calendar control and the Microsoft Multi Media Player control.

Note that the Server does not transform third-party ActiveX controls into HTML for delivery to form users. However, one can use ActiveX controls and other COM-based components to perform work as part of the script processing executed by the Server.

ActiveX controls or other COM components should preferably not be used that will display on the user interface and that will require user-initiated actions.

In Designer, third-party controls behave like native objects. One can include them in a calculation, script, or tabbing sequence on the form.

2.12 Digital Signatures

Security features may be added to forms to verify that form data has not been tampered with. Using the signature object, one can protect the integrity of forms by allowing end users to use certificates to digitally sign form data. Once the data is signed, it cannot be altered on the form. Verifying the signature guarantees that no one has tampered with the data after it was submitted.

2.12.1 Using Digital Signatures

When a user signs a form, a message digest of the data to be signed is created and a mathematical computation combines the user's private key with the specified form data and encrypts them together. The output is a digital signature. This digital signature contains the locked form object values and the certificate information of the person who signed the form. When viewed as part of the submitted XML form data, the encrypted data is unreadable.

When the Server's cryptographic component verifies the signature, it uses the public key to read the signed data and compares the signed data to the unencrypted data on the form. If the encrypted and unencrypted data do not match, this means that the data has been tampered with since it was signed and the verification fails.

2.12.2 Working With the Signature Object

In preferred embodiments, the signature object allows users to use a certificate to sign data that they enter into specified objects on the form. To use the signature object, one typically places FSSIGN_ and FSVERIFY_ command buttons on the form. The name of the command button links it to the signature object.

When the user clicks the sign button, the fields containing the data to be signed, as specified by the SignedObjects property, become read-only and cannot be modified. After the data is signed, anyone who opens the form and data can click the verify button to verify that the data has not been modified since it was signed.

One can place more than one signature object on a form. For example, if the form is part of a workflow, different users in the process may need to sign data in different fields.

To use the signature object to sign form data, typically an applet or plug-in must be installed on the end-user's system, such as Entrust/TruePass or SmartTrust WebSigner.

2.12.3 A First Example

One preferred embodiment of this invention uses a system such as Entrust/TruePass™, which uses a Java applet that is transparently downloaded and executed in the user's Web browser. The applet downloads the user's private key from an Entrust certificate database and uses it to sign the data. To download a private key from the Entrust database, the user must be authenticated by Entrust server components and associated with an Entrust profile.

When the user clicks the FSSIGN_ button on a form, the following actions occur:

1. All calculations and validations run.
    Any validation errors must be corrected before the data is signed.
2. The data is posted to the Server, which creates the message digest and returns an HTML frameset.
    The frameset consists of two frames, one for the form and data and the other to invoke TruePass Java applet. The fields to be signed are made read-only.
2 If the user is not logged in to the Entrust server or has timed-out then the TruePass applet opens a user authentication page in the bottom frame to log in.
3 When logged in, the user must then click the Sign button that appears in the bottom frame, which calls into the TruePass applet to create the digital signature. The signature is included in the XML data sent to the Server when the form is submitted.

To verify a signature on a form, the user clicks the corresponding FSVERIFY_button. The form is posted to the Server, which uses its CryptoAPI component to verify the signature against the form data. A message box informs the user if the signature is verified.

2.12.4 A Second Example

Another preferred embodiment of this invention uses the SmartTrust WebSigner™ the, component for which is installed in the user's browser as a plug-in. It can use any certificate stored locally in the browser such Microsoft Internet Explorer or on a smart card to sign form data.

When a user clicks the FSSIGN_ button on a form, the following actions occur:

1. All calculations and validations run.
    Any validation errors must be corrected before the data is signed.
2. The data is posted to the Server, which creates the message digest and returns an HTML frameset.
    The frameset consists of two frames, one for the form and data and the other to invoke the WebSigner plug-in. The fields to be signed are made read-only.
3. The user must then click the Sign button that appears in the WebSigner frame at the bottom of the screen.
4. The WebSigner dialog appears. The user must select the certificate to use for signing, enter a PIN, and click OK.
5. The WebSigner plug-in creates the digital signature. The signature is included in the XML data sent to the Server when the form is submitted.

To verify a signature on a form, the user clicks the corresponding FSVERIFY_button. The form is posted to the Server, which uses its cryptographic API component to verify the signature against the form data. A message box informs the user if the signature is verified.

3. Collecting Information Using the Server

The Server is a service that processes, transforms, and delivers forms. It can do the following:

Transform the form template into a presentation language (format) that matches the target device;

Provide server-side execution of the intelligence in the form template; and

Generate a PDF document of the form template and data

The Server supports a system where the presentation and data reside on the client computer and the form intelligence resides on the Server. Users of forms gain access to forms via any type of Web browser. The Server delivers a form and renders it in the format that best matches the presentation and form filling capabilities of the target browser. The Server accomplishes this by extracting the field information and the boilerplate information from the form template (typically XFA-XFT). It then converts it to a version of the browser language that best suits the target browser. For example, the Server delivers the form template in the appropriate language, such as DHTML, HTML, or Java by automatically detecting the browser and the end-user environment, whether PC, Mac, UNIX, or Linux. This can be done without the end user having to download and install additional software.

The Server uses a set of transformation utilities to merge data with a form template (typically XFA) to deliver a form in at least the following formats:

HTML, including HTML 3.2, Microsoft® DHTML, MSHTML 4, and Compact HTML ("CHTML");

Cascading Style Sheet;

Generic Java Applets;

Wireless Markup Language ("WML"); and

PDF format for local printing.

As part of the transformation, the Server can execute the validations and calculations included on the form and return the resulting data to the browser. Calculations and validations can also be executed on the client side using a script language such as JavaScript.

As referred to earlier, the Server is stateless and as such, is typically activated when a response to a specific request is required (via the API). The Server executes the request and then shuts down. Client-side calculations and validations for a field occur immediately after the focus is removed from that field.

3.1 How Browser Detection May Work

Preferred embodiments of this invention uses the HTTP header User-Agent to determine the type of client/browser making a request for a form. The actual detection may be performed at the web server or the form server.

A table is maintained of browser capabilities. Each entry in the table has a number of properties that defines the capabilities of that particular client/browser. One of the maintained properties identifies the transformation ID that the preferred embodiments use to render the form for that particular client/browser. Adjustments are made to each transformation depending on the properties defined in the table entry for that particular client/browser.

The corresponding entry in the table is determined by doing a regular expression match against the User-Agent string. The regular expression that matches the most characters in the User-Agent string determines the winning entry in the browser capabilities table.

3.2 How the Server Processes a Request

A user needs to understand how the Server processes requests. Most intelligence on the form is typically executed on the Server. For example, when a user clicks a button on a form, the data is posted to the Server. The Server then merges the received data into the form template and executes any programming associated with the button that was clicked. In some cases, client-side calculations and validations are supported by the browser, allowing some intelligence to be executed by the browser on the client side. In one possible embodiment, the FormServer object uses the following two methods to initiate and process a request (method names are given as examples for explanatory purposes):

The GetForm/GetFormEx method (gets a requested form); and

The ProcessHTTPRequest/ProcessHTTPRequestEx method (processes the submitted data)

When end users request a form from the Server (or click a button or image on a form), they initiate a series of specific processes and interactions between the Server, their browser, and the Web application.

When a user requests a form, the Web application initiates a method (the GetForm method) to request the form from the Server. The call to the Server includes the name of the requested form and the form presentation. When the user environment is unknown, the Server determines the format in which to render the form based on the browser information that is passed with the method call. The Server transforms the form template, form image, and data into output suitable for the target browser.

The Server runs the form scripts in the sequence described below, and then passes the HTML package or the rendered form to the user via the API.

The typical script sequence:
OnInitialize event for all pages and for each field
Data is loaded
OnCalculate event for all pages and for each field
OnPageEnter event for the page that is displayed
OnFormReady event for the entire form The following summarizes a typical order of actions in the applications and the Server when the user requests a form in one embodiment.

| Step | User/client | Application | Server |
|---|---|---|---|
| 1 | Selects a form from a Web page or search engine. | | |
| 2 | | Creates a Server (FS) object and calls the GetForm(...) method by asking for a specific XFT form. | |
| 3 | | | Opens the form and runs all initialize scripts for the entire form (all pages). |
| 4 | | | If data is passed to the Server (in the XMLData parameter of the GetForm call) then the Server merges the data into the initialized template. |
| 5 | | | Runs all OnCalculate scripts for the entire form. |
| 6 | | | Runs the OnPageEnter script for the first page. |
| 7 | | | Runs the OnFormReady script. |
| 8 | | | Determines the browser capabilities. Creates the appropriate transformation snap-in component. Passes the current template, in its initialized/calculated state, to the transformation snap-in component. |
| 9 | | | The Server snap-in transforms the initialized template into an appropriate HTML page. The page contains the required data and intelligence that permits the form to be filled out by the end user and then submitted to an application. The particular application is specifically named by the calling application in the TargetURL parameter of the GetForm call. The application then returns the HTML back to the Server by using HTML formatted as a Unicode string. |
| 10 | | Verifies that the Server did not return an error and then performs a BinaryWrite to the browser with the HTML returned from the Server. | Converts the HTML Unicode string into an appropriate multi-byte character string (MBCS) for delivery to the client browser. The Server uses the CharSet property of the ApplicationContext object passed into the Server as a parameter of the GetForm call to determine the proper MBCS format. The Server then returns the MBCS string to the application that initiated the call. |
| 11 | | | If a high-end browser (such as Internet Explorer 5 or Netscape Navigator 6) is used, the browser does the following: Runs each field initialization marked to run at client Runs the page initialization marked to run at client |

| Step | User/client | Application | Server |
|------|-------------|-------------|--------|
|      |             |             | Runs each field calculation marked to run at client |
|      |             |             | Runs the page calculations marked to run at client |
| 12   | Browser displays the new HTML Web page to the user. | | |

3.3 Using Command Buttons

In order for the Server to process a form, the form must provide the mechanism by which to send data to the Server. This is typically accomplished through the use of command buttons. Here is an example of how this might work:
1. An end user opens a form, fills in the first page, and then clicks the button labelled NextPage.
2. A call to the Server is initiated.
3. The call prompts the Server to execute the script or perform a function associated with the NextPage command button.

The function might include one of the following:
Performing field calculations
Validating data
Printing the form
Collecting the data from page one and merging it into page two
Presenting page two to the end user.

The caption (text or image), displayed on a command button label, usually indicates the function of the button. When an end user clicks on a command button, the form-related processing is prompted by the scripting and marking associated with the command buttons. The Name property of a command button object is used by an application to invoke specific actions on the Server.

There are generally two types of command buttons: special buttons and common buttons.

3.3.1 Special Buttons

A special button is a button that requests the Server to perform a specific action. Each of the special buttons has a universal service function that is invoked when an end user clicks on the corresponding command button.

When the application logic is created, a preferred embodiment uses the following button property Names (as examples to facilitate subsequent explanation) to specify specific actions:
FSSUBMIT_
FSRESET_
FSPRINT_
FSPREVIOUS_
FSNEXT_
FSSIGN_
FSVERIFY_

3.3.2 Common Buttons

A common button is a button that requests the Server to execute a calculation operation. When a user clicks a button scripted with the Name property value, for example CALCULATE (or any value other than that of the special buttons) the Web application typically issues a request call (ProcessHTTPRequest) to the Server. Then the Server executes the calculation operation (OnCalculate script) and produces the returned data.

For certain types of browser platforms, such as MS-DHTML and Java formats, the Server passes the data to the open Web page and updates the display. For other formats, the Server transforms the form and merges it with the data, and passes a new HTML page to the Web browser.

The Server runs the scripts in the following sequence:
Click event for the named button
OnCalculate event for all fields
OnCalculate event for the page The following table summarizes the order of generic actions in the application and the Server when the end user clicks a common button in a preferred embodiment.

| Step | User/client | Application | Server |
|------|-------------|-------------|--------|
| 1 | On a Form Server-generated form, an end user clicks a common button. If button is marked "current-client", and if the button's click event is marked "run at the client browser", then no submission to Web server is performed. The script for the click event is executed at the client browser. | | |
| 2 | | Creates a Server (FS) object and calls the GetForm(...) method by asking for a specific XFT form. | |

| Step | User/client | Application | Server |
|---|---|---|---|
| 3 | | Creates a Server (FS) object and calls the GetForm(...) method by asking for a specific XFT form. | |
| 4 | | | Opens the XFT form and looks for any previous state data to use for base initialization. If data is found, the Server restores the form to the previous state by merging the data into the template. |
| 5 | | | The Server merges any new data into the form template. For multi-page forms, the Server makes sure new data is merged into the appropriate page in the template. |
| 6 | | | Runs the Click script in the template, for the specific button that was clicked. |
| 7 | | | Runs all the OnCalculate scripts for the entire form. |
| 8 | | | Returns a ReturnStream value to the calling application based on the Browser Capabilities, as follows: If the browser is Microsoft Internet Explorer 5, the Server returns XML Data. If the browser delivered an Applet based on the original GetForm call, the Server returns a stream of Name/Value pairs. In all other cases, the Server returns a new HTML page, or the same page in a Multi-page form, based on the new state of the form. The returned FSAction code will be set to FSCalculate. |
| 9 | | Verifies that the Server did not return an error, that the FSAction code is FSCalculate, and then performs a BinaryWrite to the browser with the HTML returned from the Server. | |
| 10 | If a complete HTML page is returned, the browser displays the new Web page. Otherwise, intelligence included in the original page (sent by the form server) merges the returned data into the HTML displayed in the browser. | | |

FSSUBMIT_ Button
When a button with the Name property set to FSSUBMIT is clicked, the application is invoked to pass the data to the Server and in turn, the Server is invoked to run the scripts for the current form in the following typical sequence:
  Click event for the FSSUBMIT_ button
  OnCalculate events for all fields
  OnCalculate event for the page
  OnValidate event for all fields, including checks for mandatory fields
  OnValidate event for the page, provided that all field validations were successful
  OnFormClosing event, provided that the validations were successful.

When the SUBMIT button is clicked, all processing for a form is typically terminated, unless:
  The application determines that another action is required
  There are validation errors detected.

Validation includes checking values for fields with the Mandatory property set to true. When there are field-level validation errors, the Server responds with HTML or data, which is returned to the Web application with a status message indicating that the processing is not complete. When no errors are detected, the Server returns the XML data to the Web application, along with a status message to indicate that the processing is complete for the form. The Web application then determines the next course of action.

FSRESET_ Button

When a button with the Name property set to FSRESET_ is clicked, the button is transformed as an HTML Reset button. When an end user clicks this button on a form, no Click, OnCalculate, or OnValidate events are executed and no data is submitted to the Server. All fields on the form are reset to their initial default values.

FSPRINT_ Button

When an end user clicks an FSPRINT_ button to initiate a print request, the Server merges the form with any form data and generates a file in PDF format. The Server returns the PDF data, via the API, to the Web application. When Adobe Acrobats Reader resides on the end user's computer, the browser launches the Web application and displays the output. The user can view, and print the form using the functionality of the Acrobat Reader.

An FSPRINT_ button FSAction returns an FSPrint (2). The application then uses the GetForm method to request a POF version of the form with the data.

FSNEXT_ and FSPREVIOUS_ Buttons

When a button with the Name property set to FSPREVIOUS_ or FSNEXT_ is clicked, the action invoked is the same as that invoked for FSSUBMIT. In addition, calculations and validations are invoked. If errors are detected, the Server responds by returning HTML or data to the client. When there are no validation errors, the Server creates a presentation for the next or previous page and returns it to the browser. The page events involved are:

Click event for the FSNEXT_ or FSPREVIOUS_ button
OnCalculate events for all of the fields
OnCalculate event for the page
OnValidate event for all of the fields, including checks for mandatory fields
OnValidate event for the page, provided that all field validations were successful
OnExit event for the page that is closing
OnEnter event for the page that is opening.

FSSIGN_ Button

Preferred embodiments of this invention provides digital signature processing. To support digital signature processing, the developer has to integrate the Server with software, such as iD2 Personal and Entrust TruePass, that has components on the client (such as applets, plug-ins, ActiveX controls, and so forth) and components on the Web server (such as servlets, ASPs and so forth). The Server uses a property on the ApplicationContext object called SecurityProvider to select which technology to use for the Sign/Verify request. Security providers that want to integrate with the Server must provide a COM object that implements a predefined interface named "iSecurityProvider".

When a user clicks the FSSIGN_ button, the Server runs the scripts for the current form.

Server receives a "Sign" request
Server instantiates the COM object for the specific security provider
Server calls the "CreateSignatureHTML( )" method, and passes the transformed form (with locked fields set as read-only), the ApplicationContext object, and the message digest.
The HTML stream returned by "CreateSignatureHTML( )", is returned to the browser replacing the current page.
At this point, the security provider COM object has control of whatever content it wants to return.

FSVERIFY_ Button

When the user clicks the FSVERIFY_ button, the Server verifies that the data signed using the corresponding signature object has not been modified since the signature was made. When the Server receives a request to "Verify" the request does the following:

Instantiates the COM object for the specific security provider.
Calls the "CreateVerifySignatureHTML( )" method
Passes the transformed form (with locked fields set as read-only), ApplicationContext object, the message digest and the base64 encoded signature extracted from the form's data.
Returns the HTML stream by "CreateVerifySignatureHTML( )" to the browser and replaces the current page. (The security provider COM object has control of whatever content it wants to return.)

The FSVERIFY_ button verifies only the data signed using the signature object specified after FSVERIFY_ in the command button Name property.

Field Level Validations in the Server

The following list explains how the Server handles field level validations by scripting in a form.

Validation scripts are executed when the end use presses a button on the HTML page with the Name property FSSUBMIT_, FSPREVIOUS_, FSNEXT_, or FSPRINT_, or FSSIGN_.
Validations are run against all fields following the field tabbing order. If there are any errors, they are returned together in the browser window along with the form. A link associated with each error jumps directly to the appropriate field on the form.
A validation error for a field designated as mandatory causes the Server to return an error status along with the text string: Mandatory Field.
Page validation scripts are run when there are no field validation errors. Since there is no Message property for a page that would allow for custom error text, the following message appears for an error: Page validations failed.

3.4 Using Forms as Embedded HTML

To allow more flexibility in presenting forms to the users, preferred embodiments of the Server can render a form in one of the following formats:

As a full HTML page, complete with the HTML, HEAD, and BODY tags: the form is displayed in the browser as is.
As a block of HTML code wrapped in a DIV tag: this DIV section can then be embedded into a custom Web page to allow organizations to retain their Web site look and feel while leveraging the Server technology.

When the Server renders the form as embedded HTML, the entire form is wrapped in a DIV section as follows:

```
<DIV id="fsFormBody">
...
transformation specific HTML
...
</DIV>
This DIV section can be used anywhere in the page body.
```

Embedded HTML 3.2 is typically not supported because it uses the form's image as a background and overlays the form's fields on top of it. Embedded PDF is also not typically supported under this invention.

3.5 Using the Server API

The API (the typical method used by applications to communicate with, and access the services of, the Server) is used to interface with the Server and integrate the Server functionality into Web applications.

This section provides a description of the Server external COM components and the Simple Object Access Protocol (SOAP) service in preferred embodiments. This invention is not restricted to such protocols.

The Server preferably runs on a server running Microsoft Windows NT or Windows 2000, but is not limited to such.

The presentation portion of an actual application that will be seen by users includes a number of components, namely forms, Web pages, and Active Server Pages ("ASP") that perform the server-side processing.

ASP contains a script executed on the Web server that translates and generates HTML to pass back to the calling browser. The browser typically only displays the HTML pages. All processing occurs on the Web server. The task of writing scripts is simplified because the scripts always run in the predictable and contained environment of the server. ASP scripts are also used to process data sent back from the browser by a POST operation, such as a confirmation.

For Web servers using non-Windows operating systems, the application can be developed in any Web server application programming environment, such as Perl, CGI scripts, Java Servlets or JSPs. The SOAP toolkit may be used to communicate with the Server running remotely on an NT or Windows 2000 platform.

3.5.1 Server External COM Components

This section provides information about the following four Server external COM components for preferred embodiments of the invention, along with their objects, methods and properties:

FormServer object
ApplicationContext object
Local FormRepository object
BrowserCapabilities object The FormServer object provides an interface to the Server. It can be used by any COM automation environment to request Server services. The Server is enabled to determine the appropriate transformation and deliver the appropriate type of form to the client. The Server can be accessed by applications, via COM interfaces, while allowing it to function within the context of a Web environment.

FormServer Object

This object is used to provide an interface to the Server. It may be created in ASP using Server.CreateObject("FormServer.Server") or in VBScript using CreateObject("FormServer. Server").

The FormServer object defines the following methods as an example of how the invention can be implemented:

| | |
|---|---|
| GetForm: | Gets the requested form (with or without data), sets the content type of the requested form (usually HTML content type), and returns it. |
| GetFormEx: | Gets the requested form (with or without data), sets the content type of the requested form (usually HTML content type), and returns it. The provides the same functionality as the GetForm call; however, it allows the Server to be called without having to create a number of objects. |
| ProcessHTTPRequest: | Processes the submitted data depending on the type of action requested, which include Submit, Print, Calculate, and Validate. |
| ProcessHTTPRequestEx: | Processes the submitted data depending on the type of request, sets the content type of the requested form (for example, text/html or text/xml) and returns it. This call provides the same functionality as the ProcessHTTPRequest call except it allows the FormServer to be called without having to create a number of objects. |

3.5.2 SOAP Service

Non-Windows platforms using SOAP (Simple Object Access Protocol) is supported in preferred embodiments of this invention, which is an open standard based on XML-RPC (Remote Procedure Calls) over HTTP. SOAP allows for remote communication between heterogeneous machines using XML based RPCs. Using SOAP, the Server is able to be called remote form both Microsoft Windows and non-Microsoft Windows-based operating systems. For Web servers using non-Windows operating systems, one can develop the application in any Web server application programming environment, such as Perl, CGI scripts or Java Servlets.

The SOAP toolkit can be used to communicate with the Server running remotely on an NT or Windows 2000 platform. This Server service program runs as a Windows NT service. The windows NT Soap Service is a multi-threaded HTTP SOAP server that executes the Server COM components in response to SOAP request. The response is sent to the SOAP clients via XML using the HTTP TCP/IP protocol. This Service listens for SOAP requests, executes the requests using the Server components, and then returns the results, via SOAP, to the caller.

Using SOAP allows the Server to be integrated into Unix-based Web Servers. The Server runs as a 'black box' on a Microsoft Windows based platform and is called remotely by programs executing on the Unix Based Web Servers.

The Server SOAP protocol is stateless so a Server Farm of Server SOAP Servers can be architected. With this architecture, the load from a Web Server can be distributed over many machines providing for greater scalability and fault tolerance.

4. Offline Form Entry

As mentioned earlier, in other embodiments of this invention, end users may retrieve an offline form package from the Server component typically via a web server (for example, also running the Server in the same system) containing a form (possibly multi-page and generated using the Designer) and submitted to the Server. Typically, there is a mechanism for the user to indicate that the offline package is desired (e.g. the user clicks a particular link which is coded on a web page to make a request for the offline package via an API call, as opposed to the regular form served up by the Server). The Server will then prepare the contents of the package using a form definition template retrieved from a computer storage after detecting the device type and environment of the user (e.g. browser type) as referred to in an earlier section. In a variation, the user may specify the particular target device type and environment, which is different from the type and environment being used by the user.

In circumstances where the device type and environment can process XML directly, such as FormFlow99™ and PocketForm™ (PocketForm runs on a mobile device) the web application will identify itself to the Server as requiring the kind of transformation which basically passes the form definition template directly with no browser code transformation. Otherwise, there is little difference in the content of the form definition (including the range of form features) or the supported environments (discussed below) for a form delivered to the user via a Server transformation and that through a Server packaging.

In the typical case, the Server transforms the form into an offline package. The offline package contains all the pages in the form in the appropriate browser language supported by the browser, any associated images and the supporting client-side script. The Server determines the platform and browser prior to creating the package and send the package associated with the platform and browser. Once the package arrives at the remote system, the remote system may then be switched to operate in the offline mode, i.e. disconnected from the Internet. Compression is preferably used to reduce the size of the package to be transmitted. At the remote site, the package is then decompressed and saved to a remote system accessible to the user on the browser platform while disconnected from the Internet (typically local to the user).

The end user then opens the offline package, typically using his or her local web browser, to access the form, filling data into the form while navigating from one page to another of a multi-page form, if a multi-page form (resulting in the form data information becoming captured). The form is displayed in a representation on the local user system identical or near identical to the representation which would be displayed to the user when the form definition is deployed on the browser platform using the Server. The user can then save the form and data in the remote system. Typically, this remote system would be the users local system. In addition, the user can open previously saved form and data to complete the form before submitting it back to the server with further entered data.

The user may submit a completely filled in form or a partially complete form and then complete the form online. There would be indication in the information stream to the Server to indicate the specific case.

Data gathered from a database may be collected in the initialization code of the form since the Server will typically execute this code prior to putting together the package for the form. As expected, once offline there can be typically no interactive database requests made since the database is typically remote to the users local system. Database validation may only be done online; all data validation performed offline is for the purpose of ensuring the correctness of data captured in local (typically XML) datasets. The user may interact with the database typically by going back on-line and requesting to re-calculate the form. In this way database accesses can take place prior to the user formally submitting the data as a completed form.

If the user needs to go offline again then the web application may be coded to allow this, in which case the current gathered data would be typically saved and then the request to Server needs to be made with code that indicates to merge the existing data prior to creating the off-line package.

Datasets (typically XML) at the user's local system provides the means to store data entered by the user (whether saved locally or not) and collected from a database, whether captured during the initialization stage or during recalculation subsequently, for later merger with the form.

A form may be multi-paged with more than one page. Multi-page forms may be managed by allowing application data to be stored in a hidden frame which is part of each page of the multi-page browser code. This data and state information is the mechanism which allows the management of the data across pages of the form. When the data is saved locally, these reside in the data files (typically XML) and when it is loaded back into the form it typically resides in the hidden frame of each page until saved or submitted.

A very small piece of code (for example a DLL, a COM object, or a Java applet) may be installed on the local user system to decode the package, save data locally and merge data back into the multi-page form. The management of the multi-page form (page navigation) may be done in browser code defining the form and would be defined typically by a form object model. Of course, the platforms (for example, running Java and Internet Explorer 5 and higher) must have the appropriate Operating System and browser code to support the rendering of the browser code and the execution of the installed component (for example, a Java VM to run the Java code and Netscape 6 and higher to render the HTML, or support for HTA's (HTML for Applications) and the ability to run the code that is installed).

The HTML environment supported would include the following

HTML 3.2;

Microsoft DHTML for Microsoft Internet Explorer 5.0;

MSHTML 4 for Microsoft Internet Explorer 4;

CSS2; and

Netscape 6

Part of the transformation requires the package to be encoded typically (but not necessarily) in base64 format and compressed in preferably a single file for transmission over the Internet. This would performed at the Server and the package then uncompressed and decoded at the local user system typically using the installed piece of code mentioned earlier.

Examples of methods and properties of a typical form object for form manipulation are the following:

| Methods | Explanation and Properties |
| --- | --- |
| AddField(sFullName, sValue, replace) | Adds the field name and value to the list of form fields.<br>sFullName - (string) Fully qualified name of field<br>sValue - (string) Value of field<br>replace - (boolean) Indicates if duplicate fields should be replaced |
| GetDataFileName( ) | Get the full path and name of the current data file. |
| GetFieldValue(fullName) | Get the value of the field specified by fullName.<br>fullName - (string) Fully qualified field name |
| getNextPageNum( ) | Return the next page number |
| getPagePath(pageNumber) | Returns the path of the page specified by page num.<br>pageNumber - (integer) Number of page to retrieve |
| getPreviousPageNum( ) | Return the previous page number |
| getRootPath( ) | Returns the root path (where the package was installed from). |

-continued

| Methods | Explanation and Properties |
|---|---|
| loadData( ) | Parses the current XML data file and extracts all field names and values. |
| saveData(appDataField) | The current list of field names and values are formatted as XML and saved back to the current data file. All data is also compressed and put in appDataField for submission back to the server. appDataField - (string) Name of field to place compressed data |
| setDataFileName(newFileName) | Set the name of the data file. newFileName - (string) Full path and name of data file. |
| unpackage( ) | Unpacks the compressed HTML files and images creating required folders as needed. |

5. Architecture

A key consideration for implementation is the system architecture chosen to be adopted. Depending on the volume of transactions expected the system to process, and the type of servers one is using, one would typically choose a two- or three-tier architecture. The following sections provide an overview of some of the architecture options.

An embodiments of this invention comprises typically of three distinct layers:

| | |
|---|---|
| Presentation: | This layer is the user service layer that gives the end user access to forms via a browser. |
| Web Application: | This layer is where the application receives requests from the user and instructs the Server how to fulfill the requests. |
| Database: | This layer is the Server, which contains the form repository and in most cases, executes the form calculations and validations and generates data. |

5.1 Two-Tier Implementation

In a two-tier implementation, the presentation layer is the first tier and the Web application and database layers form the second tier. This means that the Server is installed in the second tier. One could select a two-tier architecture if the Web servers are using Windows NT or Windows 2000 operating systems. It is important to note that this configuration reduces the granularity of scaling because the Web application and Server are installed on the same machine.

There are at least two possible configurations. Configuration 1 has a SOAP interface interposed between the web application and the Server, with all three on the same machine, the SOAP interface being used locally to service web application requests. In configuration 2, the web application makes direct requests of the Server.

Comparatively, requests running through the SOAP service, as under configuration 1, are processed faster than direct Server requests. In the event that such an application must be migrated to a three-tier, the work related to migration would be greatly simplified.

5.2 Three-Tier Implementation

In a three-tier architecture the presentation layer is on the first tier, the second tier is devoted to security and application services, and the third tier provides the database storage and access. If one is working in a Windows operating system, one could use a two- or three-tier architecture, with or without the SOAP Service. However, if one is working in UNIX operating system, one will have to use a three-tier architecture with the SOAP Service.

When a three-tier architecture is implemented, the support for publishing a form becomes more complex than when an embodiment is installed to adhere to a two-tier architecture. The complexity results from having to install and administer the extra machines involved in the third tier. In this location of the third tier, the Server will perform to its maximum capacity when servicing remote requests from the Web application server. It typically behaves as a black box, with no state, and therefore can be replicated as transaction volume grows.

The number of needed servers is completely dependent on the load the Web application has been sized to support. The complication occurs when several Servers operate at this tier. A new form (or revision of a form) must typically be forwarded to each Server in order for requests to be made and for every Server to render exactly the same transformation.

5.4 Using SOAP

Various embodiments of this invention support SOAP remote function calls, which means that the Form Sever is flexible and can exist at either the second or third tier within the architecture. This multi-threaded service responds to the Server API requests and forwards them to the actual Server components that carry out the work. If the servers are remote, the publish request will be directed through the remote server's SOAP Service. Whether working in a two-tier or three-tier architecture, it is preferable to access the SOAP service for maximum efficiency.

The invention has been described using primarily method and software embodiments. This invention also includes systems, devices, computer codes, computer program products and data structures for implementing the above to realize the functions described, as would be apparent to persons skilled in the art.

The previous description of the preferred embodiments is provided to enable any person skilled in the art to make and use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope for methods, computer code, computer program products, data structures, devices, and systems consistent with the claims set forth below.

All patents, patent applications and other documentation, whether available in printed or electronic format, are incorporated in whole by reference.

What is claimed is:

1. A method for creating and serving customized electronic forms to a plurality of users, the users using different ones of a plurality of browser platforms, each of the plurality of browser platforms having different respective browser platform characteristics, the method comprising:

receiving a request for an electronic form from a user, the request including data supplied by the user;

retrieving a form definition template defining an electronic form to be displayed to a user, the template being deployable for display to users on each of the plurality of browser platforms;

initializing the form definition template by accessing previous state data for the user and merging the previous state data into the form definition template;

merging the data supplied by the user into the initialized template;

determining the browser platform characteristics for the user browser;

transforming the initialized template into an electronic form compatible with the user browser platform; and delivering the electronic form to the user browser.

2. The method of claim 1, where the request for an electronic form includes the name and format of the requested form.

3. The method of claim 1, where the form definition template is an XML-based document.

4. The method of claim 1, where transforming the initialized template comprises processing the data supplied by the user.

5. The method of claim 4, where processing the data supplied by the user comprises performing calculations on the data.

6. The method of claim 4, wherein processing the data supplied by the user comprises validating the data.

7. The method of 6, where validation is performed by accessing a database including user data.

8. A system for creating and serving customized electronic forms to a plurality of users, the system comprising:

a plurality of different browser platforms, each of the plurality of browser platforms having different respective browser platform characteristics;

a web server in communication with the plurality of browser platforms and in communication with a plurality of remote user systems, each of the user systems using different ones of the plurality of browser platforms;

a computer storage storing a form definition template, the form definition template defining an electronic form to be displayed to a user, the template being deployable for display to users on each of the plurality of browser platforms; and a form server in communication with the web server and computer storage, the form server operable to:

receive a request for an electronic form from a user, the request including data supplied by the user, retrieve the form definition template from the computer storage in response to a request including data supplied by the user, initialize the form definition template by accessing previous state data for the user and merging the previous state data into the form definition template, merge the data supplied by the user into the initialized template, determine the browser platform characteristics for the user browser, transform the initialized template into an electronic form compatible with the user browser platform, and deliver the electronic form to the user browser.

9. The system of claim 8, where the request for an electronic form includes the name and format of a requested form.

10. The system of claim 8, where the form definition template is an XML-based document.

11. The system of claim 8, where the form server transforms the initialized template by processing data supplied by the user.

12. The system of claim 11, where processing data supplied by the user comprises performing calculations on the data.

13. The system of claim 11, wherein processing data supplied by the user comprises validating the data.

14. The system of claim 13, further comprising a database including user data, and where the form server performs validation by accessing the database including user data.

15. The system of claim 8, where the electronic form is an HTML page.

16. The system of claim 8, wherein the electronic form is a PDF document.

17. A computer program product, tangibly stored on a computer storage, the product comprising instructions operable to cause a programmable processor to perform operations for creating and serving customized electronic forms to a plurality of users, the users using different ones of a plurality of browser platforms, each of the plurality of browser platforms having different respective browser platform characteristics, the operations comprising:

receiving a request for an electronic form from a user, the request including data supplied by the user;

retrieving a form definition template defining an electronic form to be displayed to a user, the template being deployable for display to users on each of the plurality of browser platforms;

initializing the form definition template by accessing previous state data for the user and merging the previous state data into the form definition template;

merging the data supplied by the user into the initialized template;

determining the browser platform characteristics for the user browser;

transforming the initialized template into an electronic form compatible with the user browser platform; and delivering the electronic form to the user browser.

18. The computer program product of claim 17, where the request for an electronic form includes the name and format of a requested form.

19. The computer program product of claim 17, where the form definition template is an XML-based document.

20. The computer program product of claim 17, where transforming the initialized template comprises processing data supplied by the user.

21. The computer program product of claim 20, where processing data supplied by the user comprises performing calculations on the data.

22. The computer program product of claim 21, wherein processing data supplied by the user comprises validating the data.

23. The computer program product of 22, where validation is performed by accessing a database including user data.

* * * * *